Figure 2:
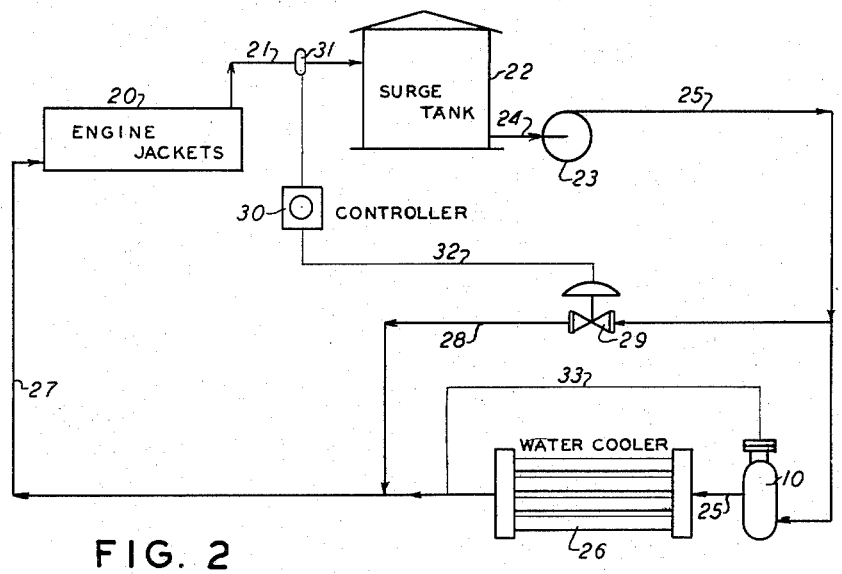

Aug. 8, 1950  H. N. WADE  2,517,812
WATER COOLING SYSTEM
Filed Oct. 25, 1948

HENRY N. WADE
INVENTOR

ATTORNEY

Patented Aug. 8, 1950

2,517,812

UNITED STATES PATENT OFFICE 2,517,812

WATER-COOLING SYSTEM

Henry N. Wade, Sierra Madre, Calif.

Application October 25, 1948, Serial No. 56,464

6 Claims. (Cl. 257—2)

This invention relates to means for the accurate control of the temperature of a stream of water used for removing heat from a heat generator such as the cylinder of an explosion engine.

In cooling large gasoline, Diesel or gas engines it is desirable to circulate a relatively large volume of water through the cylinder jacket and thus to maintain a relatively small difference between the temperature at which the water enters the jacket and that at which it is discharged. For example, it is considered good practice to supply water to the jacket at about 140° Fahr. and to discharge it at about 150° Fahr. It is also highly desirable to maintain the temperature of the stream entering or leaving the jacket as nearly constant as may be possible.

In the engine cooling systems ordinarily employed the hot water discharged from the jackets is pumped in a constant volume stream to a cooling means from which it is returned to the jackets, completing the cycle. This cooling means, of whatever nature, functions by transferring the excess heat from the water to the atmosphere and thus, whether the atmospheric cooling be direct or indirect, the effectiveness of any given installation will vary over a wide range with variations in the temperature and, usually, in the humidity of the ambient atmosphere.

In the endeavor to maintain the jacket water at constant temperature through changes in atmospheric conditions it is common practice to provide a bypass around the cooling means and to place in this bypass a valve which opens and closes in response to changes in the temperature of the water stream as it enters or as it leaves the engine jacket. This bypass and its included valve permits a varying proportion of the pumped stream to pass around the cooling means and mingle with the cooled portion of the stream. If then the cooling means be of sufficient capacity to effect the desired degree of cooling, under the worst atmospheric conditions, when the entire stream is passed through it, the provision of the controlled bypass provides, in theory, a means for holding the temperature of the combined stream at a constant level through changes in the effectiveness of the cooler.

The above described arrangement, however, functions advantageously only so long as atmospheric conditions which affect cooling vary only within a narrow range: this because the diversion of any part of the total stream away from the cooling means reduces its flow resistance and, in consequence, the pressure difference under which the bypass valve functions.

For example, if the pressure difference between the two ends of the cooler is five pounds per square inch when the entire circulated stream is passing through it (as under atmospheric conditions the least favorable to cooling) this pressure difference will fall to four-ninths of 5 or 2.22 pounds per square inch when atmospheric conditions so change that one-third of the total stream must be bypassed around the cooler to maintain the required temperature. Such variations in the pressure head under which the bypass valve functions seriously affect its functioning and in fact a control system in which the bypass valve operates under a widely variable pressure difference ordinarily fails to produce sufficiently close temperature regulation.

Further, where "dry" or radiator type coolers are used to dissipate heat directly to a stream of air, it is obvious that there will be an extreme variation in cooling effectiveness between summer and winter. It is not uncommon to find that, if enough cooling surface is provided for adequate heat dissipation under extreme summer conditions, it may be necessary to bypass as much as eighty percent of the cooling stream around the cooler under extreme winter conditions in order to avoid over-cooling. Under such conditions the pressure drop through the cooler would be only four percent of maximum. Since only this pressure difference is available to move eighty percent of the stream through the bypass and control valve, adequate sizing of these elements is difficult and expensive.

The present improvement over the conventional system above described comprises means for maintaining a constant pressure difference between the two sides of the bypass valve, causing it to be directly and dependably responsive to temperature control. A preferred form of this means is illustrated in the attached drawings and the following description thereof, in which Fig. 1 is a detail, in section, of a preferred form of differential pressure valve, and Fig. 2 is a diagram illustrating the position of the differential pressure valve in the system and the manner in which it functions.

Figure 1:
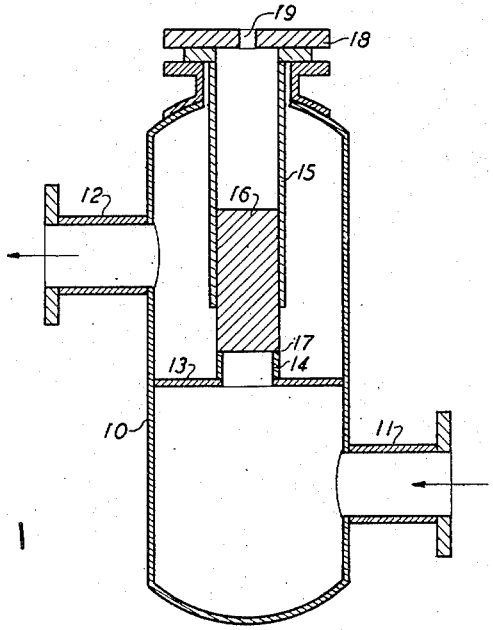

Referring first to Fig. 1, a housing 10 is provided with an inlet nozzle 11 and an outlet nozzle 12. At an intermediate level the housing is divided into two chambers by a horizontal partition 13 carrying an upwardly projecting nozzle or throat 14, the upper end of which is faced to form a seat.

Depending from the upper end of the housing is a guide tube 15 within which a dead weight piston 16 is fitted to rise and fall without appreciable friction. The diameter of the piston is approximately equal to the outer diameter of throat 14 and at least the outer portion of its lower end is turned smooth to rest on the upper end of the throat as at 17. The length of the piston should be such that its weight in pounds divided by its cross-sectional area in square inches equals or slightly exceeds the pressure drop across the cooler, in pounds per square inches, when the entire circulated stream is passing through the cooler. The upper end of the guide tube is closed by a flange 18 having a small threaded opening 19.

While the element 16 is illustrated as a solid block of metal, it actually provides three functional elements. The lower face of the block functions as a valve disc, mating with the upper end of the throat as at 17 for entirely cutting off the water supply to the cooler in starting up a cold system; the lower end and side walls constitute a plunger which advances and retracts the disc with respect to the seat, and the solid body of the block provides (when arranged more or less vertically) a constant force urging the disc toward the seat. It will be evident that the disc and the plunger might be arranged as separate elements moving in unison and that the constant force could be provided by means other than dead weight, as for example a spring having a very flat force constant or a cylinder or diaphragm chamber containing an elastic fluid under substantially constant pressure.

Referring now to Fig. 2, a gas engine cylinder jacket or group of such jackets connected by headers is indicated at 20, the heated water passing through conduit 21 to a surge tank 22. From this tank a pump 23 draws a stream of hot water through conduit 24 and discharges it through conduit 25 to a water-cooling means 26. This cooler consists of coils or banks of tubes which may be cooled directly by circulated air, but are more commonly cooled by sprays of water which is itself cooled by partial evaporation. The circulated water stream, after cooling in this element, is discharged through conduit 27 to the jacket inlet headers, completing the cycle.

The water cooler is bypassed by a conduit 28 in which is placed a diaphragm-operated valve 29. The movements of this valve are produced by a controller 30, which may desirably be also a temperature recorder, this controller being responsive to the temperature in the engine jacket discharge line 21 in which the thermometer bulb 31 is placed, the controller and the valve being so coupled that the valve moves in an opening direction as the temperature falls and in a closing direction with rising temperature. In the illustrated position, the temperature controller will operate to hold constant the temperature of the water stream leaving the jackets. If preferred, the thermometer bulb may be placed in conduit 27 at some point between the jacket inlet header and the junction of conduits 27 and 28, in which position the controller will operate to hold constant the temperature of the water entering the jackets.

The pressure equalizing valve illustrated in Fig. 1, or its equivalent, is placed in series with the water-cooling means and on its upstream side, as at 10 in Fig. 2, and the opening 19 in flange 18 is connected with conduit 27 by a tube 33. This tube may be of small diameter as there is substantially no flow of liquid through it, the purpose being to apply to the upper end of piston 16 the pressure obtaining at the discharge end of the cooling means.

The pressure required to lift the piston being, as stated, equal to the pressure drop across the cooler at maximum flow, when bypass valve 29 is fully closed the difference in pressure between the chambers at the bottom and at the top of the piston will just balance its weight (the constant actuating force) and the piston will rise in guide tube 15 to permit the entire circulated stream to pass through the annulus between the lower end of the piston and the upper end of throat 12. In this position of the piston the valve adds to the back pressure exerted by the cooling means only the immaterial resistance due to fluid friction and turbulence.

If now valve 29 be opened partially by the action of the temperature control, permitting part of the water stream to flow through the bypass, the reduction in velocity of flow through the cooler reduces the pressure drop which it occasions, the pressure in housing 10 becomes insufficient to support the piston at its maximum elevation, and the piston subsides, narrowing the annulus between its lower end and the upper end of the throat. The piston then comes to rest at such position that the reduced pressure drop across the cooler plus the pressure drop caused by restriction of the annulus equals the weight of the piston in pounds per square inch, which is a constant at any elevation of the piston.

Thus the pressure drop through the series (valve plus cooler) is a constant the value of which is determined by the relation between the cross sectional area of the piston and the constant force urging it toward the seat, and the temperature responsive bypass valve functions at a constant pressure difference between its two sides and becomes completely and dependably responsive to the temperature controller.

A further advantage of the invention lies in the fact that it eliminates all variations in total flow of liquid through the system, since it maintains constant the total pressure drop through the system of coolers and jackets. In thermostatically controlled systems in which the differential pressure control valve is not used, the flow rate through the system will vary to some extent, tending to increase when the bypass valve opens and to decrease as it closes. This effect is particularly apparent where a centrifugal pump is used for circulating the cooling water, as is the almost universal custom. Since the delivery of such pumps varies to some degree inversely with the amount of the pressure head against which they discharge, changes in the total resistance of the outside circuit produce inverse changes in the amount of fluid circulated. Such changes in turn cause variations in the temperature differential between inlet and outlet of jackets. Such variations are generally objectionable, since they produce undesirable variations in the thermal expansion of cylinders and jackets.

I claim as my invention:

1. In a water cooling system including a heat source, a circulating pump, a water cooler and conduits connecting said heat source, pump and cooler in a closed circuit, a bypass conduit and a control valve therein responsive to the temperature of the stream in one of said conduits; pressure-regulating means comprising: a resistance valve in series with said cooler, said resistance valve including means for adding to the variable flow resistance of said cooler with varying velocity of flow therethrough a second resistance of varying value, the sum of said resistances being a constant with varying rates of flow through said cooler; said bypass conduit extending across both said cooler and said resistance valve.

2. In a water cooling system including a heat source, a circulating pump, a water cooler and conduits connecting said heat source, pump and cooler in a closed circuit, a bypass conduit and a control valve therein responsive to the temperature of the stream in one of said conduits; pressure-regulating means comprising: a resistance valve in series with said cooler, said resistance valve including means actuated by a constant force for restricting the flow through said cooler and thereby adding to the varying flow resistance of said cooler with varying velocity of flow therethrough a second resistance varying inversely with the variations in first said resistance, the sum of the two resistances being a constant with varying rates of flow through said cooler; said bypass conduit extending across both said cooler and said resistance valve.

3. In a water cooling system including a heat source, a circulating pump, a water cooler and conduits connecting said heat source, pump and cooler in a closed circuit, a bypass conduit and a control valve therein responsive to the temperature of the stream in one of said conduits; pressure-regulating means comprising: a resistance valve in series with said cooler, said resistance valve including gravity actuated means for restricting the flow through said cooler and thereby adding to the varying flow resistance of said cooler with varying velocity of flow therethrough a second resistance varying inversely with the variations in first said resistance, the sum of the two resistances being a constant for varying rates of flow through said cooler; said bypass conduit extending across both said cooler and said resistance valve.

4. In a water cooling system including a cooling means having inlet and outlet conduits, the pressure drop across said cooling means normally varying with the velocity of flow therethrough, a bypass conduit connecting said inlet and outlet conduits around said cooling means and a temperature-responsive control valve in said bypass; pressure-regulating means comprising: a valve seat in the path of flow of water through said cooler and in series therewith and a piston having its end disposed to mate with said seat, said piston being arranged to be displaced from said seat by fluid pressure difference between said inlet and outlet conduits and being urged toward said seat by gravity, said piston being of such weight as to be substantially supported by a fluid pressure difference equal to the pressure drop across said cooling means when said bypass valve is closed; said bypass extending across both said cooling means and said valve seat and piston.

5. In a water cooling system including a cooling means having inlet and outlet conduits, a bypass conduit connecting said inlet and outlet conduits and a control valve in said bypass; pressure-regulating means comprising: a valve seat disposed in the path of flow of water through said cooling means and in series therewith, and a piston disposed to mate with said valve seat, said piston being arranged to be displaced from said seat by fluid pressure difference between said inlet and outlet conduits and being urged toward said seat by a constant force, the value of said force being such as to permit said piston to be displaced from said seat by a fluid pressure difference equal to the pressure drop across said cooling means when said bypass valve is closed; said bypass extending across said cooling means and said valve seat and piston.

6. In a water cooling system including a cooling means having inlet and outlet conduits, a bypass conduit connecting said inlet and outlet conduits and a control valve in said bypass; pressure-regulating means comprising: a fixed element and a movable element in series with said cooling means and forming a restriction of variable area in the path of flow of water through said cooling means, said movable element being urged toward said fixed element by a constant force, the value of said force being so adjusted that the pressure drop caused by said restriction is equal to the reduction in pressure drop across said cooling means following from reduction in velocity of flow therethrough; said bypass extending across both said cooling means and said variable restriction.

HENRY N. WADE.

REFERENCES CITED

The following references are of record in the file of this patent:

UNITED STATES PATENTS

| Number | Name | Date |
|---|---|---|
| 1,396,239 | Andrews | Nov. 8, 1921 |
| 1,568,926 | Stoll | Jan. 5, 1926 |
| 2,175,460 | Guildford | Oct. 10, 1939 |
| 2,176,331 | Drapeau | Oct. 17, 1939 |
| 2,254,917 | Schroder | Sept. 2, 1941 |
| 2,303,063 | Peebles | Nov. 24, 1942 |
| 2,328,132 | Ernst | Aug. 31, 1943 |

FOREIGN PATENTS

| Number | Country | Date |
|---|---|---|
| 295,133 | Italy | Apr. 13, 1932 |

OTHER REFERENCES

Rhodes, pages 442, 443 and 444 of "Industrial Instruments for Measurement and Control," published 1941 by the McGraw-Hill Book Company, New York.